Oct. 15, 1940.  A. L. LANGEL  2,217,987
BAKING PAN
Filed July 21, 1939  2 Sheets-Sheet 1
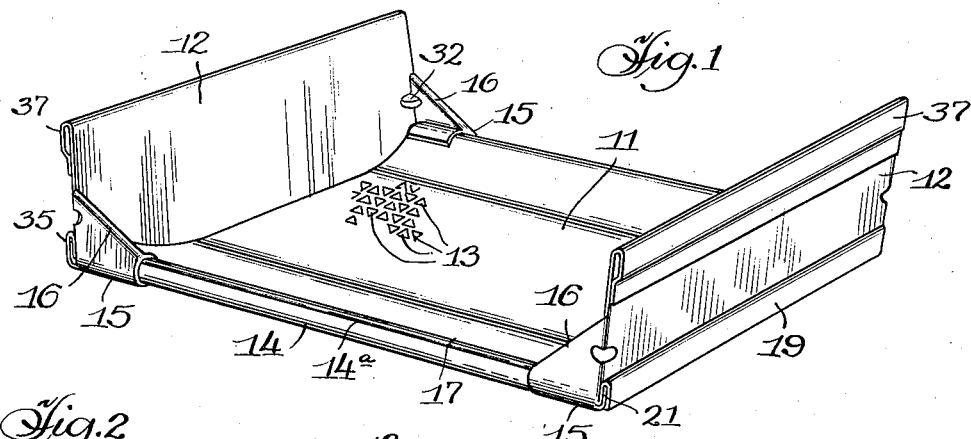
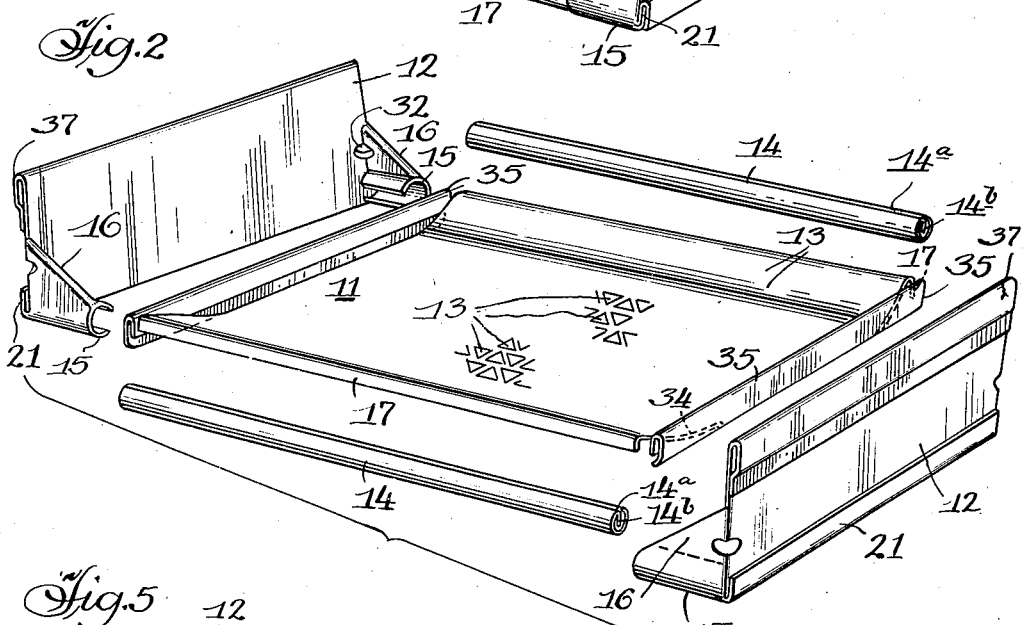
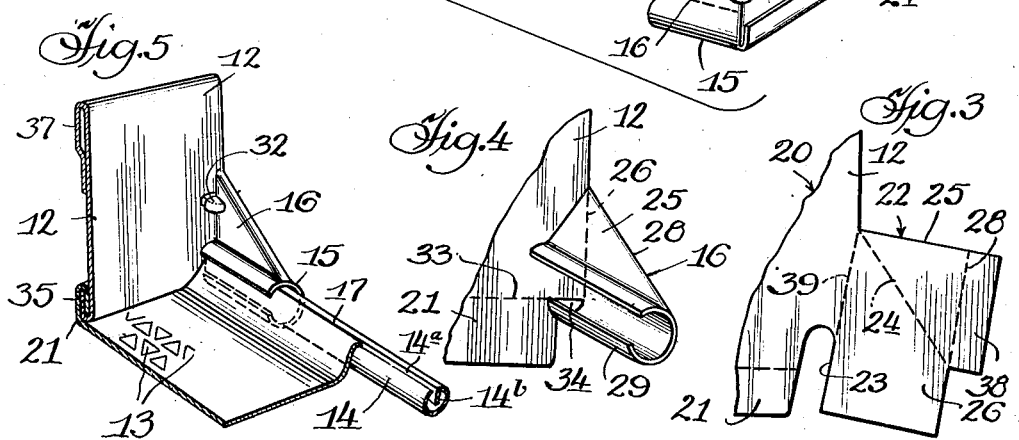
INVENTOR.
Adrien L. Langel,
By Zabel, Carlson, Fitzhugh & Wells
ATTORNEYS.

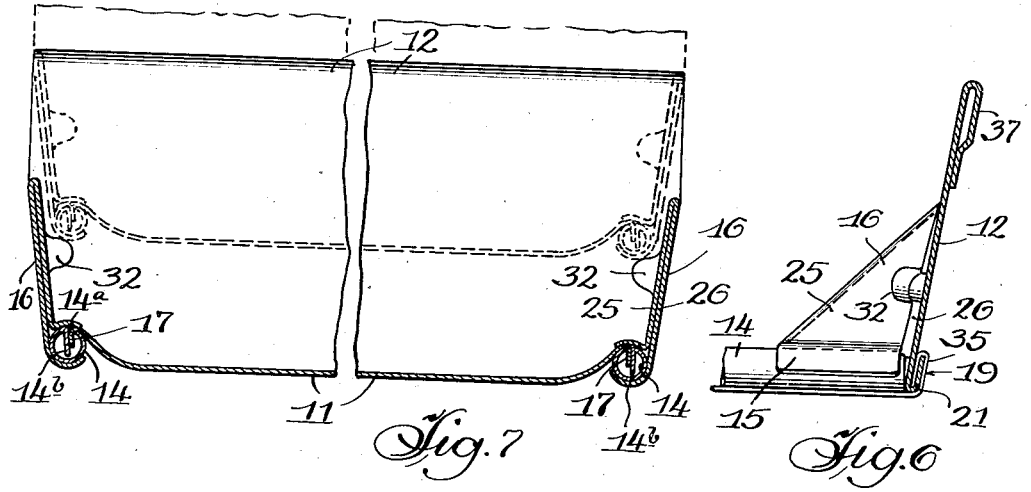
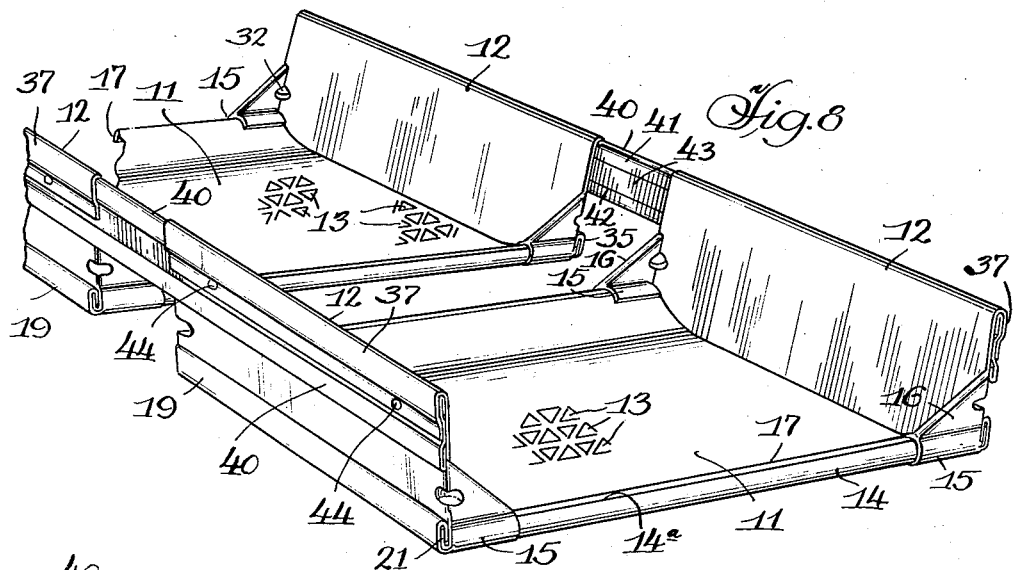
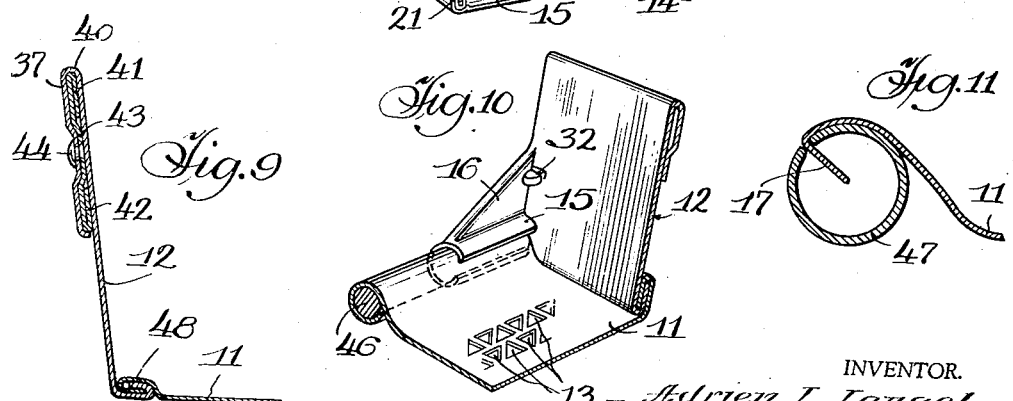

Patented Oct. 15, 1940

2,217,987

UNITED STATES PATENT OFFICE 2,217,987

BAKING PAN

Adrien L. Langel, Chicago, Ill., assignor to Chicago Metallic Manufacturing Company, Chicago, Ill., a corporation of Illinois Application July 21, 1939, Serial No. 285,673

17 Claims. (Cl. 53—6)

The invention relates to baking pans and has for its object the production of a simple and inexpensive construction for baking pans of the type which may be used in the production of bread by the open hearth method.

The baking pan construction which comprises my invention may be embodied either in a single pan or in a multiple unit pan, the improved construction being characterized by the fact that the usual side walls are omitted and that other reinforcing means have been used for supplying the required strength and rigidity. For attaining my objects, I have provided an improved end wall structure having sockets formed integrally therewith at opposite sides effectively connected together by reinforcing bars.

The end wall construction may also be provided with an integral stacking lug which will facilitate the stacking of the pans when not in use so that the end walls and bottom of one pan will not come in contact with those of an adjacent pan disposed either above or below it.

Other objects, features and advantages will become apparent as the description proceeds by reference to the drawings, in which—

Fig. 1 is a perspective view of a preferred embodiment of my invention;

Fig. 2 is an expanded perspective view showing more clearly the relationship of the elements to each other;

Fig. 3 is a fragmentary elevation of a blank from which the end wall and socket are formed;

Fig. 4 is a fragmentary elevation of the blank shown in Fig. 3 after it has been partially formed;

Fig. 5 is a perspective view of a fully formed socket and bracket associated with the end wall, together with the bottom and the reinforcing bar assembled therewith;

Fig. 6 is an enlarged section of the end wall of the pan shown in Fig. 1, the socket being shown in elevation;

Fig. 7 is a transverse section through the improved pan, with a second similar pan shown by dotted lines in stacking relation;

Fig. 8 is a perspective view of a multiple unit pan, broken away at one corner, the pans forming the unit being constructed according to my invention;

Fig. 9 is a section of the end wall of one of the pans of a modified form of multiple unit pan, showing in detail the means by which the end bars are fixed to the end wall;

Fig. 10 is a detailed perspective view similar to that of Fig. 5 but showing a modified form of my invention; and Fig. 11 is a cross sectional view of a modified form of side bar member.

In the drawings, reference numeral 11 refers to the bottom member of a pan which also comprises end walls 12, the bottom member 11 being provided with perforations 13 in the form of a series of triangles which permit free circulation of the hot gases through the bottom to insure even baking of the bread and the formation of crust on all sides thereof. Reinforcing bars 14 are provided at opposite sides of the pan, the bars 14 in the arrangement shown being in the form of tubes having openings 14a along their top faces, with downturned reinforcing flanges 14b positioned along the openings. Each end of each reinforcing bar is received in a socket 15 which is mounted on a bracket 16 at the corresponding corner of the pan, the arrangement being such as to brace the end wall members 12 very strongly with respect to each other. The bottom member 11 is provided with downwardly directed flange portions 17 at its side edges extending into effective engagement with the side bars 14 throughout their full length, the sockets 15 being cut out at their inner face portions so that the bottom member may extend into the sockets. The reinforcing bars are preferably spot welded to the bottom member 30 but may be otherwise secured thereto. As shown in Fig. 2, the bottom member 11 is provided with an extended portion 35 at each end thereof which passes beneath the end wall and is folded up over and about an upwardly directed flange 21 formed with the end wall to provide a seam 19.

The seams 19 give transverse rigidity to the bottom member, which is reinforced longitudinally by the bars 14, with the result that the structure is very strong and sturdy so as to stand up satisfactorily through long periods of very hard use.

Fig. 3 shows a fragmentary corner portion of a blank 20 from which the end wall and its associated socket are formed integrally with each other. As is shown in this figure, the flange portion 21 of the blank is partially separated by a slot 23 from a corner extension 22 which extends laterally beyond the side edge of the end wall as well as downwardly below the bottom edge thereof. For forming the triangular bracket 16 by which the end walls are braced with respect to the side bars 14, the corner extension 22 is doubled upon itself along the dotted line 24, for bringing the upper panel portion 25 downwardly into face engagement with the lower panel portion 26. The metal is also folded along the dotted line 28 to provide a flange portion 38 which is shaped to form the top half of the socket while the free lower end part of the portion 26 is shaped to form the lower half of the socket, the metal being folded along the dotted line 39 for bringing the double walled bracket into position at right angles to the end wall as shown in Fig. 4.

In each of the brackets 16, a stacking lug 32 is provided, pressed inwardly in the two thicknesses of metal at the edge of the panel 25 and at the junction of the panel 26 with the end wall. The arrangement is such that the interengaging portions of these lugs brace the panel portions 25 and 26 with respect to each other for strengthening the brackets. This reinforcing effect is increased further by a rigid connection of both the top and the bottom face portions of each socket with the interposed side bar 14.

The flange portion 21 of the end wall member (see Figs. 3 and 4) is folded outwardly along the dotted line 33 into engagement with the seam portion 35 of the bottom member 11. The bottom member is cut as shown at 34 in Fig. 2 to partially separate the seam portion 35 from the main portion of the bottom member so that the latter may extend over the reinforcing bar 14. The upper edge of the end wall is bent over to provide a downwardly directed flange 37, the lower edge portion of the flange being offset inwardly to provide in effect a box formation.

As is shown in Fig. 7, when two pans are stacked in nested relation, the upper pan rests on the lugs 32 of the next lower pan in such manner that the outer wall surfaces of the upper pan do not engage the inner wall surfaces of the lower pan. It will be noted that the end walls and the brackets are sloped outwardly and upwardly to effect this result. The separation of the corresponding elements of adjacent pans when stacked facilitates drying, and the confining of the points of contact of the stacked pans with each other to the stacking lugs and bottom corners of the pans prevents the destruction of the tin plating or other protective coating of the elements at those points which are likely to come in contact with the bread. Furthermore, the disposition of the lugs and their rounded configuration are such that a great number of pans may be stacked on each other without danger of the pile being tipped over under normal conditions of use.

In Fig. 8 two of the pans constructed in accordance with my invention are shown strongly connected together into unit form by end bars 40, each of said bars having its upper edge and its lower edge portions 41 and 42 folded back in the form of flanges, the central portion 43 of the sheet metal being offset inwardly between the folded over edges. The end bars 40 are secured to the end wall members 12 by rivets 44 passing through the bars and through the flanges 37 but not through the body portions of the end plates. The loaf is thus kept out of contact with the rivets. Although I have shown only two pans associated with the end bars 40, it is understood that in practice any desired number of pans may be associated with each other to form each multiple unit.

A modification of the reinforcing bar construction is shown in Fig. 10 wherein a solid metal bar 46 is substituted for the tubular bar 14 of the other figures. In this arrangement, the side edge portions of the bottom wall member are curled completely about the side bars for providing the desired rigidity of the structure.

Another modification is shown in Fig. 11, comprising a tubular side bar 47 having an opening along its face but without the reinforcing flange 14b. Other forms of side bar also may be employed.

In the arrangement shown in Fig. 9, a modified connection between the bottom 11 and the end wall 12 is employed. In this construction, the lower edge of the end wall is turned inwardly instead of outwardly so as to position the seam 48 inside of the pan instead of outside. This enables me to continue the seam 48 at both sides of the pan clear to the bracket 16 instead of leaving an opening at 34.

By the use of the improved construction as above described, a bottom support in the form of a flat plate and end wall portions in upright position thereon are provided, the end walls being strongly braced in position without the necessity for the use of side wall members. This expedient is made practical by the provision of the double walled triangular brackets having sockets formed therewith for engagement with the side bars 14 by which the parts are reinforced and braced with respect to each other. The end plates serve to limit the length of the loaf and give the loaf a square configuration so that the end slices shall be of substantial size.

By the arrangement of the individual pan without side walls, the loaf is more easily removed from the pan, and the structure is made lighter without detracting from its strength. With the reinforcing bars made of steel, a very sturdy construction is assured, one which is adapted to stand up well under hard usage. With the stacking lugs positioned for holding the pans out of objectionable contact with each other along the inner faces of the walls, the pans are maintained in good condition indefinitely so as to assure the production of good looking loaves by their use.

By the use of the arrangement by which I am enabled to omit the usual side walls of the pan, the width of the pan is substantially cut down and I am enabled to place the pans closer together in the oven without interfering with the circulation of the heated air between the loaves. The capacity of the oven is thus substantially increased without any substantial increase in the cost of operation. By the use of reinforcing bars 14 of tubular form, the even heating of the pan in a minimum period is assured so as to bring about an even baking of the loaves at all points so far as is possible, thus assuring the production of a good looking loaf having a smooth unbroken surface.

While there have been shown and described certain embodiments of the invention, it is to be understood that it is capable of modification. Changes, therefore, may be made without departing from the scope of the invention as described in the appended claims, in which it is the intention to claim all novelty inherent in the invention as broadly as possible, in view of the prior art.

I claim:

1. In a baking pan unit, the combination of end wall portions, heavy reinforcing bars rigidly connecting said end wall portions together at their lower edges, and a substantially flat straight bottom member connected at its side edges with said reinforcing bars.

2. In a baking pan unit, the combination of end wall portions, heavy reinforcing bars rigidly connecting said end wall portions together at their lower edges, and a bottom member comprising a substantially flat straight piece of sheet metal inclined upwardly to a slight extent at its side edges so as to overlie said reinforcing bars and rigidly connected with said reinforcing bars.

3. In a baking pan unit, the combination of end wall portions, heavy reinforcing bars rigidly connecting said end wall portions at their lower edges, a substantially flat straight bottom member connected at its side edges with said reinforcing bars, and brackets bracing said end wall portions with respect to said reinforcing bars and located at the corners only of the unit so as to leave the pan open at its side edge portions.

4. In a baking pan unit, the combination of end wall portions, heavy reinforcing bars rigidly connecting said end wall portions together at their lower edges, and a substantially flat straight bottom member of sheet metal connected rigidly at its side edges with said reinforcing bars and connected rigidly at its ends with said end wall portions.

5. In a baking pan unit, the combination of end wall portions, heavy reinforcing bars rigidly connecting said end wall portions together at their lower edges, and a substantially flat straight bottom member of sheet metal connected rigidly at its side edges with said reinforcing bars and extended at its ends underneath said end wall portions and connected rigidly with said end wall portions by an interfolded seam arrangement at the outer faces of the end wall portions.

6. In a baking pan unit, the combination of two end wall portions of sheet metal, socket members carried by said end wall portions at opposite sides thereof and located directly at the lower edges of said end wall portions, reinforcing brackets bracing said socket members strongly with respect to said end wall portions, reinforcing bars rigidly connected with said sockets, and a bottom member of sheet metal connected at its side edges with said reinforcing bars and connected at its ends with said end wall portions.

7. In a baking pan unit, the combination of two end wall portions of sheet metal, brackets formed of sheet metal bent into shape and rigidly connected with said end wall portions so as to provide sockets extending longitudinally of the pan at the lower edges of said end wall portions, reinforcing bars rigidly connected with said sockets, and a substantially flat straight bottom member of sheet metal connected at its side edges with said reinforcing bars and at its ends with said end wall portions.

8. In a baking pan unit, the combination of two end wall portions of sheet metal, brackets formed of sheet metal doubled upon itself and firmly connected with said end wall portions, the doubled over portions being shaped to provide sockets extending longitudinally of the pan at the lower edges of said end wall portions, reinforcing bars rigidly connected with said sockets, and a bottom member of sheet metal rigidly connected at its side edges with said reinforcing bars and at its ends with said end wall portions.

9. In a baking pan unit, the combination of two end wall portions of sheet metal having combination bracket and socket members formed integrally therewith at opposite sides and bent to extend longitudinally of the pan at the lower edges of said end wall portions, reinforcing bars rigidly connecting the sockets of one end wall portion with the sockets of the other end wall portion, and a bottom member of sheet metal connected rigidly at opposite side edges with said reinforcing bars and connected rigidly at its ends with said end wall portions.

10. In a baking pan unit, the combination of two end wall portions of sheet metal, brackets formed of sheet metal and firmly connected with said end wall portions at opposite sides and each doubled over upon itself to provide two closely adjacent panels which are spread apart at their lower edges and shaped to provide the top and bottom face portions of a socket, reinforcing bars connecting the sockets of one end wall portion with the sockets of the other end wall portion and serving by rigid connection with both the top and the bottom face portions of the sockets to brace the panels of each bracket with respect to each other, and a bottom member of sheet metal connected rigidly at opposite side edges with said reinforcing bars and connected rigidly at its ends with said end wall portions.

11. In a baking pan unit, the combination of end wall portions, reinforcing bars of tubular form with comparatively heavy walls rigidly connecting said end wall portions together, and a bottom wall member connected rigidly at its side edges with said reinforcing bars.

12. In a baking pan unit, the combination of end wall portions, reinforcing bars in the form of split tubes having comparatively heavy walls rigidly connecting said end wall portions together at their lower edges, and a bottom wall member of sheet metal having flanges at its side edges extending through the longitudinal openings of said split tubes for providing a rigid connection between the reinforcing bars and the bottom wall member.

13. In a baking pan unit, the combination of end wall portions, reinforcing bars each in the form of a tube split along one face and having an inwardly directed flange at one side of the opening extending substantially completely across the tube, means for connecting said reinforcing bars rigidly with said end wall portions at each end of the pan, and a bottom wall member connected rigidly at its side edges with said reinforcing bars.

14. In a baking pan unit, the combination of end wall portions, reinforcing bars each in the form of a tube split along one face and having an inwardly directed flange at one side of the opening extending substantially completely across the tube, means for connecting said reinforcing bars rigidly with said end wall portions at each end of the pan, and a bottom wall member of sheet metal having flanges at its side edges extending through the longitudinal openings of said split tubes for providing a rigid connection between the reinforcing bars and the bottom wall member.

15. In a baking pan unit, the combination of two end wall portions of sheet metal, brackets formed integrally with said end wall portions at opposite sides, reinforcing bars connecting the brackets of one end wall portion with the brackets of the other end wall portion, a bottom member of sheet metal connected rigidly at opposite side edges with said reinforcing bars and connected at its ends with said end wall portions, and lugs pressed inwardly in said end wall portions and said brackets at their junction points in position for supporting a similar pan unit nested therewith.

16. In a baking pan unit, the combination of two end wall portions of sheet metal, brackets formed integrally with said end wall portions at opposite sides, reinforcing bars connecting the brackets of one end wall portion with the brackets of the other end wall portion, with such end wall portions in slightly convergent position downwardly with respect to each other, a bottom member of sheet metal connected rigidly at opposite side edges with said reinforcing bars and connected at its ends with said end wall portions, and lugs pressed inwardly in said end wall portions and said brackets at the corners of the pan in position for supporting a similar pan unit nested therewith and for holding the inner face portions of the walls of the lower pan out of contact with the upper pan.

17. In a multiple pan unit, the combination of a plurality of pans arranged side by side in spaced relation to each other, each of said pans comprising two end wall portions of sheet metal having outwardly and downwardly turned flanges at their upper edges with the lower edge portions of the flanges offset inwardly so as to provide with said end walls substantially a box formation, and end bars at opposite ends of the pan positioned underneath said downwardly turned flanges and connected in position by securing devices passing only through said flanges and said end bars, said end bars having downwardly turned flanges along their upper edges so as to have substantially an interlocking engagement with the flange arrangements of the end wall portions of said pans.

ADRIEN L. LANGEL.